United States Patent
Tan et al.

(10) Patent No.: US 9,395,988 B2
(45) Date of Patent: Jul. 19, 2016

(54) MICRO-OPS INCLUDING PACKED SOURCE AND DESTINATION FIELDS

(71) Applicant: Samsung Electronics Co., Ltd., Suwon-si (KR)

(72) Inventors: Teik-Chung Tan, Austin, TX (US); Bradley Gene Burgess, Austin, TX (US); Ravi Iyengar, Austin, TX (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 651 days.

(21) Appl. No.: 13/790,661

(22) Filed: Mar. 8, 2013

(65) Prior Publication Data

US 2014/0258687 A1   Sep. 11, 2014

(51) Int. Cl.
*G06F 9/30* (2006.01)
*G06F 9/38* (2006.01)

(52) U.S. Cl.
CPC ........ *G06F 9/30098* (2013.01); *G06F 9/30105* (2013.01); *G06F 9/384* (2013.01)

(58) Field of Classification Search
CPC .. G06F 9/384; G06F 9/30098; G06F 9/30105
See application file for complete search history.

(56) References Cited

U.S. PATENT DOCUMENTS

| | | | |
|---|---|---|---|
| 6,041,404 A | 3/2000 | Roussel et al. |
| 6,192,464 B1 | 2/2001 | Mittal |
| 6,567,902 B1 | 5/2003 | Padmanabhan |
| 6,748,521 B1 | 6/2004 | Hoyle |
| 7,155,601 B2 | 12/2006 | Chennupaty et al. |
| 7,191,317 B1 | 3/2007 | Wilson |
| 7,395,298 B2 | 7/2008 | Debes et al. |
| 7,555,514 B2 | 6/2009 | Pedersen et al. |
| 7,685,408 B2 | 3/2010 | Wolff et al. |
| 2008/0077772 A1 | 3/2008 | Zohar et al. |

OTHER PUBLICATIONS

Ergin et al.; "Register Packing: Exploiting Narrow-Width Operands for Reducing Register File Pressure"; 2004; IEEE.*

\* cited by examiner

*Primary Examiner* — Benjamin Geib
(74) *Attorney, Agent, or Firm* — Sughrue Mion, PLLC

(57) ABSTRACT

A method and apparatus for register packing prior to register renaming in a microprocessor are provided. The method includes: receiving a plurality of micro operations (micro-ops) decoded from one or more instructions; packing a plurality of registers which are included in the micro-ops into a packed register structure including a plurality of packed registers based on a preset number of rename ports of a renamer through which the packed registers are read or written for register renaming; and sending the packed registers for register renaming.

32 Claims, 4 Drawing Sheets

MICRO-OPS INCLUDING PACKED SOURCE AND DESTINATION FIELDS

BACKGROUND

1. Field

Methods and apparatuses consistent with exemplary embodiments relate to packing source register fields and destination register fields in micro-operations (micro-ops) executed in a microprocessor before a register renaming stage.

2. Description of the Related Art

Modern microprocessors typically break down or translate high-level instructions, e.g. macro instructions, into low-level, hardware-executable micro-ops at decoders provided therein to improve efficiency of data processing. The number and format of decoded micro-ops depend on high-level instruction set architecture and internal microprocessor architecture.

A micro-op typically has two or three source operands and one or two destination operands. The source operands are used to specify registers which contain source data. Destination operands are used to specify registers to which results of an operation of the micro-op are written after the operation has been performed.

The number of source and destination registers for a specific micro-op depends on the type of instruction being executed. For example, an ADD instruction has two source operands and one destination operand. A multiply-accumulate instruction has three source operands and one or more destination operands. A branch instruction has just one source operand to specify an indirect branch address, but has no destination operand. After micro-ops are decoded out, the micro-ops are sent to a renamer where the registers of the micro-ops are renamed before the micro-ops are scheduled and executed. Register renaming is a common technique for elimination of data hazards, such as write-after-read and write-after-write hazards in an out-of-order execution of micro-ops. A renaming process includes checking a rename table for each register, reassigning different or additional physical registers to replace destination registers of the micro-ops, recording data on the dependencies between the micro-ops. The renamed micro-ops are sent to a scheduler and execution unit. The executed micro-ops are then sent to the destination register and/or the memory or cache for storage.

Register renaming is a bottleneck for timing and performance in high-speed microprocessor designs. The limitation is more significant when the number of source and destination registers is increased. In order to optimize overall performance, it is advantageous to maximize the number of micro-ops to be renamed per cycle without increasing the number of rename ports of a renamer.

SUMMARY

In order to address a problem of a related art renaming process, one or more exemplary embodiments of the inventive concept provide methods and apparatuses to increase the number of micro-ops to be renamed per cycle without increasing the number of rename ports of a renamer.

One or more exemplary embodiments also provide a method and apparatus for packing source registers and destination registers into a packed register structure prior to renaming the registers in order to enhance efficiency of register renaming operations.

According to an aspect of an exemplary embodiment, there is provided an instruction processing method including: receiving a plurality of micro operations (micro-ops) decoded from one or more instructions; packing a plurality of registers which are included in the micro-ops into a packed register structure including a plurality of packed registers based on a preset number of rename ports of a renamer through which the packed registers are read or written for register renaming; and sending the packed registers for register renaming. Here, each of the registers packed into the packed register structure may include valid source data or valid destination data.

The method may further include renaming the packed registers, wherein the preset number of the rename ports is set to be less than a number of entire registers which the micro-ops are allowed to have as operands in one cycle.

Each of the registers to be packed into the packed register structure may be selected from among predetermined registers selected from among the entire registers based on valids information and age information about the predetermined registers.

The packed register structure may further include attribute information about each of the registers packed into the packed register structure, wherein the attribute information includes: information about whether each of the registers has valid source or destination information; identifier of each of the registers; and identifier of a micro-op among the micro-ops which includes each of the registers.

The identifier of the micro-op may include information about a decoder which has decoded the micro-op.

The attribute information may further include age information about each of the registers.

The method may further include: determining whether a number of the packed registers exceeds the preset number of the rename ports, wherein if it is determined that the number does not exceed the preset number, the packed registers are sent for register renaming in a current cycle, and wherein if it is determined that the number exceeds the preset number, one or more registers included in one or more micro-ops among the plurality of micro-ops are sent for register renaming in a following cycle.

The preset number may be less than a number of entire registers which the micro-ops are allowed to have as operands.

Each of the source registers and the destination registers to be packed by a packer may be a valid register.

The one or more micro-ops may be selected from among the plurality of micro-ops based on ages of the plurality of micro-ops.

According to an aspect of another exemplary embodiment, there is provided an instruction processing apparatus including a packer which is configured to: receive a plurality of micro operations (micro-ops) decoded from one or more instructions; pack a plurality of registers which are included in the micro-ops into a packed register structure comprising a plurality of packed registers based on a preset number of rename ports of a renamer through which the packed registers are read or written for register renaming; and send the packed registers for register renaming.

The preset number of the rename ports may be set to be less than a number of entire source registers which the micro-ops are allowed to have as operands in one cycle.

The apparatus may further include a controller which determines whether a number of the packed registers exceeds the preset number of the rename ports, wherein if it is determined that the number does not exceed the preset number, the controller controls the packer to send the packed registers for register renaming in a current cycle, and wherein if it is determined that the number exceeds the preset number, the controller controls the packer to send one or more registers included in one or more micro-ops among the plurality of micro-ops for register renaming in a following cycle.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION OF THE EXEMPLARY EMBODIMENTS

Figure 1:
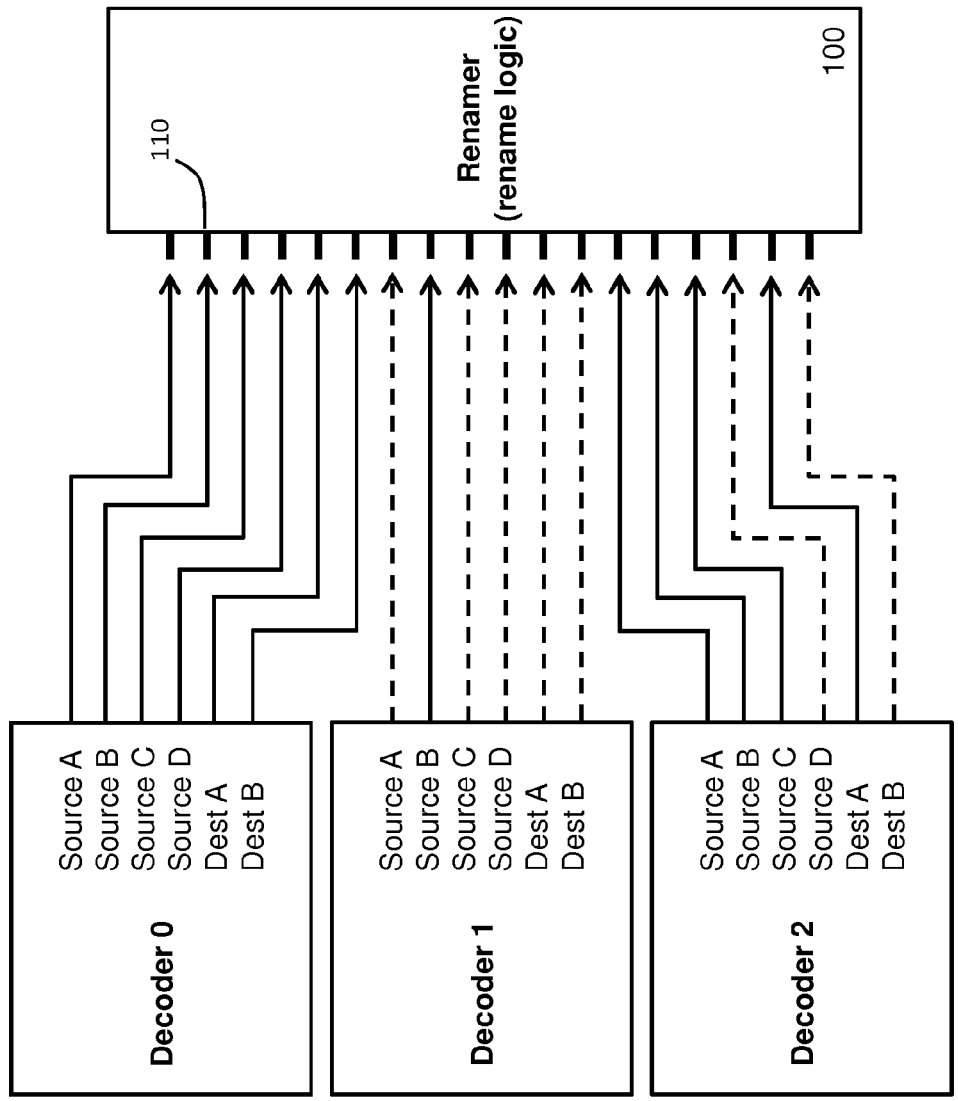
FIG. 1 illustrates a portion of a microprocessor according to an exemplary embodiment.

Exemplary embodiments will be described in details with reference to accompanying drawings so as to be easily realized by a person having ordinary skills in the art. The inventive concept may be embodied in various forms without being limited to the exemplary embodiments set forth herein. Descriptions of well-known parts have not shown in details to avoid unnecessarily obscure to the present invention, and like reference numerals refer to like elements throughout.

As a preliminary consideration, following methods may be proposed to improve the frequency thereby enhance performance of a microprocessor: reducing the number of micro-ops which include registers to be renamed per cycle or reducing the decode width; reducing the number of source and destination fields in micro-ops; taking an additional cycle(s) to rename registers; and building a custom rename circuitry to meet timing which impacts power and design complexity, etc. However, these methods may still involve sizing rename ports of a renamer to the worst-case number of source registers and destination registers, which may impact timing or architectural performance of a microprocessor.

In order to optimize overall performance of a microprocessor in terms of register renaming, it is considered to maximize the number of micro-ops to be renamed per cycle by providing a renamer with an optimal number of source registers and destination registers per cycle without increasing the number of rename ports, as described in the exemplary embodiments below.

FIG. 1 illustrates a portion of a microprocessor 10 which includes a plurality of decoders 0, 1 and 2, and a renamer 100, according to an exemplary embodiment. As shown in FIG. 1, the decoders generate micro-ops by decoding one or more instructions (not shown) received from a memory or cache (not shown). The renamer 100 renames source registers and/or destination registers in the micro-ops using a rename logic. The microprocessor 10 has a decode width of three. The decode width refers to the number of micro-ops decoded in a cycle. The renamer 100 may have 18 rename ports 110 corresponding to the total number of source resister fields and destination register fields of the micro-ops can have. That is, the format of micro-ops of the microprocessor 10 supports up to four source registers (A, B, C and D) and two destination registers (A and B), and thus, the total number of registers that may be generated in a cycle is 12 source registers and six destination registers. This decoder and renamer structure may require the renamer 100 to have up to 18 rename ports for renaming.

Figure 2:
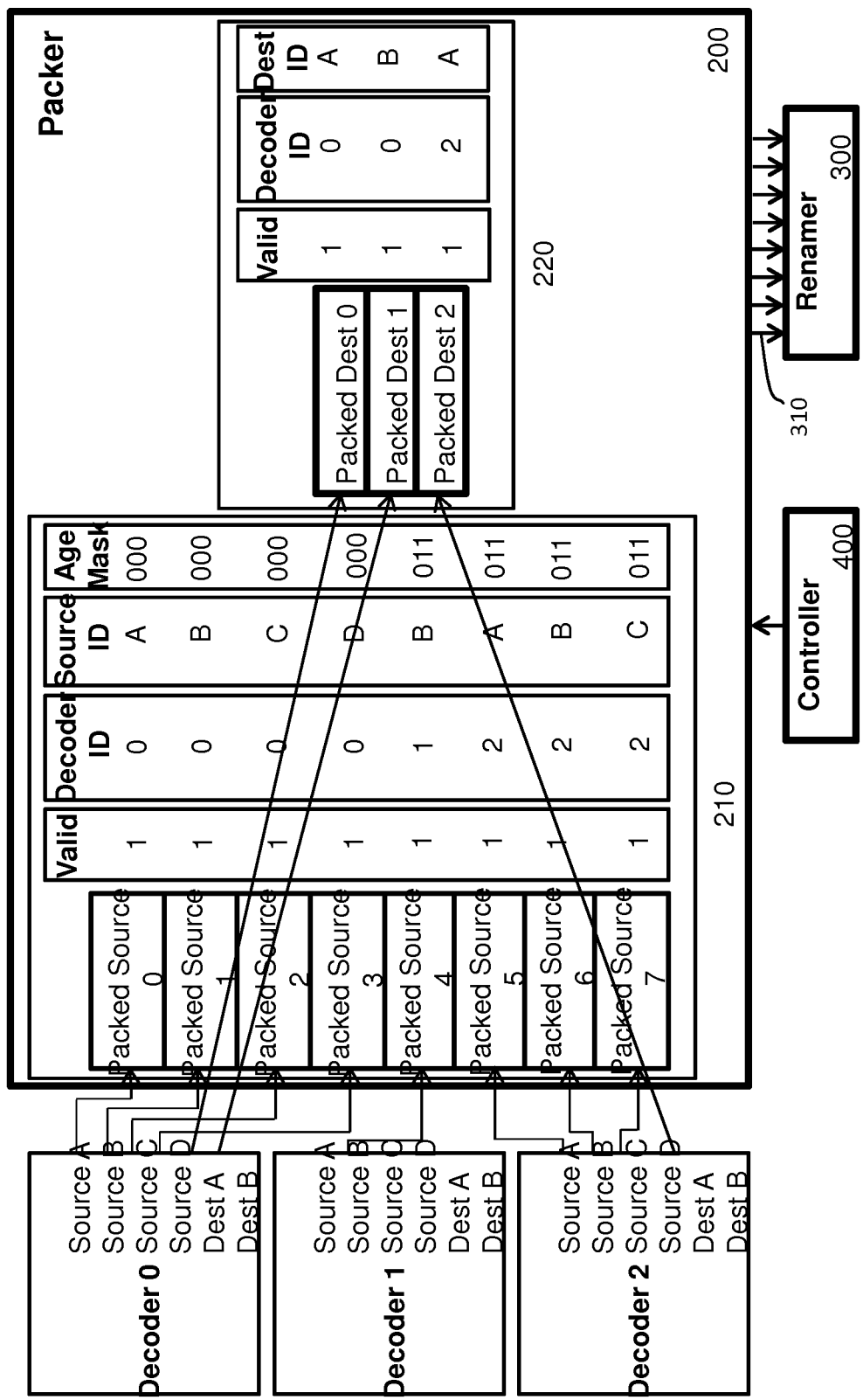
FIG. 2 illustrates a portion of a microprocessor configured to pack source registers and destination registers into a packed register structure, according to an exemplary embodiment.

FIG. 2 illustrates a portion of a microprocessor 20 which includes a plurality of decoders 0, 1 and 2, a packer 200, a renamer 300 and a controller 400, according to an exemplary embodiment. The decoders 0, 1 and 2, and the renamer 300 of the microprocessor 20 may be similar to those of the microprocessor 10 of FIG. 1. However, the microprocessor 20 is configured such that source register fields and destination register fields of micro-ops decoded by the decoders are packed before the registers are renamed, according to an exemplary embodiment. Hereinafter, packing source register fields and packing destination register fields of micro-ops are also referred to as packing source registers and packing destination registers, respectively. The packer 200 is configured to pack source registers and destination registers in micro-ops decoded by the decoders into a packed source structure 210 and a packed destination structure 220, respectively, before the registers are renamed at the renamer 300. The packed source structure 210 and the packed destination structure 220 are collectively referred to as a packed register structure herebelow. The controller 400 is configured to control at least an output operation of the packer 200 as described later. Here, each of the source registers and the destination registers to be packed into the packed register structure may be a register which has valid source or destination data. That is, any register which is included in the micro-ops and does not have valid source or destination data may not be packed into the packed register structure.

In the present embodiment, the microprocessor 20 shown in FIG. 2 has a decode width of three with the three decoders 0, 1 and 2 like the microprocessor 10 shown in FIG. 1 to decode complex instructions such as macro instructions into the micro-ops in each cycle. Also, the micro-op format of each decoder supports four source registers (A, B, C and D) and two destination registers (A and B) like the microprocessor 10 in FIG. 1. The registers A, B, C and D may be referred to as architectural registers specified in the micro-ops in contrast to physical registers to which the architectural registers are mapped by renaming in the renamer 300. Since three micro-ops are decoded per cycle in the present embodiment, a total of 12 source registers and six destination registers can be generated by these three decoders within one cycle period. In the present embodiment, the packed source structure 210 has eight entries to accommodate up to eight packed source registers, and the packed destination structure 220 has three entries to accommodate up to three packed destination registers.

In FIG. 2, prior to renaming at the renamer 300, eight source registers and three destination registers are packed into the packed register structure based on a preset number of rename ports 310 of the renamer 300. Here, the preset number of the rename ports 310 of the renamer 300 is eight. Specifically, eight source registers (A, B, C, D, B, A, C, D) of the three micro-ops are packed to constitute the packed source structure 210 having eight entries of eight packed source registers (Packed Source 0 to Packed Source 7). Similarly, three destination registers (A, B and A) of the three micro-ops are packed to constitute the packed destination structure 220 having three entries of three packed destination registers (Packed Dest0 to Dest2). Thus, the total number of the packed source registers and the packed destination registers in the packed register structure is eight which is the same as the number of the renamer ports 310. These source registers and destination registers packed into the packed register structure are provided from source fields and destination fields of the micro-ops, respectively. The packing of the source registers and the destination registers may process concurrently or at different times.

If the total number of the packed source registers and the packed destination registers for the micro-ops is equal to or less than the preset number of the rename ports 310, then the packed source registers and packed destination registers are sent to the renamer 300 in the same cycle for renaming these packed registers, under control of the controller 400, according to an exemplary embodiment. Here, the preset number of the rename ports 310 may be a system-allowable maximum number of rename ports. If the number of the packed source registers and the packed destination registers exceed the preset number of the rename ports 310, then one or more micro-ops among the micro-ops received from the decoders 0, 1 and 2 are sent to the renamer 300 in a following cycle for renaming packed source and/or registers in these selected micro-ops, under control of the controller 400, according to an exemplary embodiment. The micro-op(s) to be sent to the renamer 300 in the following cycle may be selected according to an age of the micro-op(s).

As shown in FIG. 2, the system-allowable maximum rename ports for source registers and destination registers may be set to eight and three, respectively, according to an exemplary embodiment. These numbers eight and three are less than the maximum number of source registers and destination registers, i.e. 12 and six, which can be generated by the three decoders within one cycle period. This maximum number of source registers and destination registers which can be generated by the three decoders within one cycle period is the same as the number of source fields and destination fields afforded by the decode width of the decoders 0, 1 and 2.

In FIG. 2, the first micro-op which is decoded by decoder 0 has four source registers and two destination registers as its operands, a second micro-op has one source register and no destination registers as its operands, and the third micro-op has three source registers and one destination register as its operands. The total number of packed source registers from the three decoders is eight and the total number of packed destination registers is three, which is the same as the system-allowable maximum number of the rename ports 310. Therefore, the packed source registers and the packed destination registers can be sent to the renamer 300 for renaming in one cycle. In this manner, the numbers of source registers and destination registers sent to the renamer 300 in each cycle are optimized.

According to an exemplary embodiment, a plurality of bits are added to the packed source structure 210 and the packed destination structure 220 to indicate attributes of the packed source registers and attributes of the packed destination registers received as respective entries of the packed source structure 210 and the packed destination structure 220, as shown in FIG. 2. The attribute bits may include valids bits, decoder identifier (ID) bits, source ID bits, age mask bits, etc. as described later. Thus, as shown in FIG. 2, attributes of each packed source register are represented by one valids bit, one decoder ID bit, one source ID bit and plural bits for an age mask vector. In addition, FIG. 2 shows that attributes of each packed destination register are represented by one valids bit, one decoder ID bit and one destination ID bit without the age mask vector bits. Now, the functions of the attribute bits are described below.

Each of the valids bits for the packed source registers indicates whether a source register from which a corresponding packed source register is originated is valid or invalid (e.g. 1 for valid and 0 for invalid). Referring to FIG. 2, each valids bit of eight entries in the packed source structure 210 is indicated as valid. This represents that each source register corresponding to the packed source register and included in the micro-ops has valid source data. Similarly, each of the valids bits for the packed destination registers indicates whether a destination register from which a corresponding packed destination register is originated is valid or invalid. Referring to FIG. 2, each valids bit of three entries in the packed register structure 220 is indicated as valid. This represents that each destination register corresponding to the packed destination register and included in the micro-ops has valid destination data.

The decoder ID bits are provided to identify decoders from which the packed registers are originated, respectively. In FIG. 2, a decoder ID for each of the first four packed source registers is 0, which represents that the first four entries of the packed source registers are originated from the decoder 0. Similarly, the decoder ID bits for the packed destination registers are provided to identify origins of the packed destination registers, respectively. According to another exemplary embodiment, the decoder ID bits may indicate IDs of micro-ops, respectively, which employ the source registers or the destination registers packed into the packed source structure 210 or the packed destination structure 220, respectively.

The source register ID bits for the packed source registers are provided to identify source registers from which the packed source registers are originated, respectively. In FIG. 2, the source register IDs for the first four packed source registers are A, B, C and D, respectively, which represents the IDs of these source registers in the decoder are A, B, C and D, respectively. Similarly, the destination register ID bits are provided to identify destination registers from which the packed destination registers are originated.

A plurality of bits for an age mask vector are also provided for each of the packed source registers. The number of bits for each age mask vector may correspond to the number of packed destination registers so that each bit of the age mask vector indicates an age attribute of a corresponding packed source register in the packed source structure 210 with respect to each of the packed destination registers in the packed destination structure 220. That is, the age mask vectors track ages of the packed source registers relative to the packed destination registers. Each bit in the age mask vector is set in consideration of an age of a packed source register relative to a packed destination register; a bit is set to 1 (or 0) when a packed source register is younger (or older) than a packed destination register that corresponds to the bit position. The age mask vector is used by the rename logic in the renamer 300 to compute inter-group source-to-destination dependencies. For example, the age mask vector for the first packed source register A in the packed source structure 210 is 000, which represents there are three packed destination registers in the packed destination structure 220 and each packed destination register is younger than the first packed source register A. In FIG. 2, the age mask vector bits are included only in the packed source structure 210. However, the age mask vector bits may be included in the packed destination structure 220 instead of the packed source structure 210 to indicate ages of the packed destination registers relative to the packed source registers, according to an exemplary embodiment. Also, the age mask vector bits may be included both in the packed source structure 210 and the packed destination structure 220, according to another exemplary embodiment.

The attribute bits described above are not limited to only the valids bits, the decoder ID bits, the source register ID bits and the age mask vector bits. Additional bits may be added to the packed register structure in FIG. 2 to indicate different attributes of the packed registers, according to an exemplary embodiment. For example, the IDs of physical registers stored in the source registers and the destination registers may be added to the packed register structure in FIG. 2.

Optimization of the numbers of source registers and destination registers sent to the renamer 300 using the packing-before-renaming approach according to the present embodiments enables more micro-ops to be renamed in a cycle, resulting in better efficiency and higher architectural performance.

Figure 3:
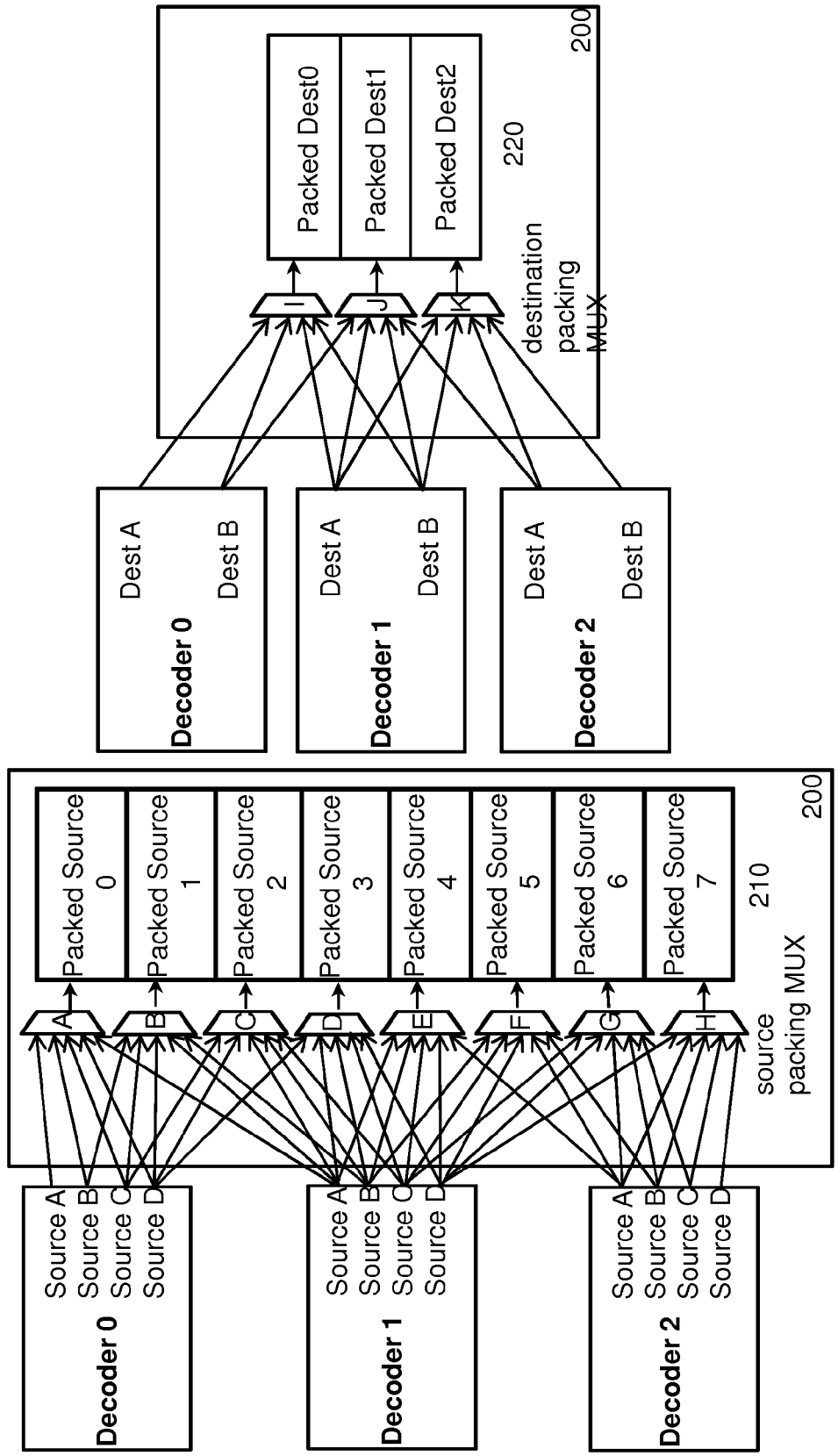
FIG. 3 illustrates a portion of a microprocessor using multiplexers in packing source registers and destination registers, according to another exemplary embodiment.

FIG. 3 illustrates a portion of a microprocessor 30 which includes a plurality of multiplexers (MUXs) A to K in addition to the same structure of the microprocessor 20 of FIG. 2, according to an exemplary embodiment. In FIG. 3, the decoders 0 to 2 coupled to the packed source structure 210 are the same decoders 0 to 2 coupled to the packed destination structure 220, and are separately indicated only for brief description purposes. In FIG. 3, the renamer 300 and the controller 400 are also omitted for brief description purposes. In the present embodiment, the eight source packing MUXs A to H are used to select source registers to be packed, respectively, and the three destination packing MUXs I to K are used to select destination registers to be packed, respectively. Specifically, for register packing, each of the eight source packing MUXs A to H is configured to receive up to a predetermined number of source registers among entire source registers which can be generated by the three decoders within one cycle period, and then select one of the received registers to constitute an entry of the packed source structure 210. Each of the three destination packing MUXs I to K is also configured to receive up to a predetermined number of destination registers among entire destination registers which can be generated by the three decoders within one cycle period, and then select one of the received registers to constitute an entry of the packed destination structure 220. More specifically, each MUX is coupled to two of the decoders 0 to 2 to receive up to a predetermined number of registers and to select a register among the received registers to output for packing with registers selected by the other MUXs.

According to another exemplary embodiment, each of the MUXs A to K may be allocated to only particular registers among the four registers A to D (not shown). For example, the source packing MUX A may be allocated to only source registers A and B of each decoder to receive only source registers A and B for selection while the source packing MUX B may be allocated to only source registers C and D. According to still another exemplary embodiment, each MUX may be allocated to a particular decoder among decoders 0 to 2 (not shown). For example, the source packing MUX A may be configured to receive only source registers used by the decoder 0.

In FIG. 3, packing the source registers and packing the destination registers are performed in parallel at the same time to minimize a possible MUX delay.

In FIG. 3, the number of registers which can be input to each MUX is restricted as explained above. FIG. 3 specifically shows a scheme to pack 12 source registers and six destination registers into eight packed source registers (Packed Source 0 to Packed Source 7) and three packed destination registers (Packed Dest 0 to Packed Dest 2). As shown in FIG. 3, each of the source packing MUXs A to H reduces the number of source registers from 12-1 to 5-1, which represents that each MUX for packing source registers is able to receive up to five unpacked source registers to select one of the five unpacked source registers to constitute an entry of the packed source structure 210. Similarly, each of the destination packing MUXs I to K reduces the number of destination registers from 6-1 to 4-1, which represents that each MUX for packing destination registers is able to receive up to four unpacked destination registers to select one of the four unpacked destination registers to constitute an entry of the packed destination structure 220. This scheme of the packed source structure 210 and packed destination structure 220 may be able to decrease the time for the selection in the MUXs without losing any architectural performance.

Each of the MUXs A to K applies a prioritization logic to selecting a source register or a destination register to be packed, according to an exemplary embodiment. For example, the source packing MUX B receives input of five source registers which include three source registers (B, C and D) from the decoder 0 and two source registers (A and B) from the decoder 1. Using the prioritization logic, the source packing MUX B selects one of the five source registers and outputs the selected source register for packing. The prioritization logic may be set based on at least one of valids information and age information about the source registers and destination registers input to each of the MUXs A to K.

An exemplary prioritization logic for the selection in MUX B is described as follows:

(a) Sel_Decoder0_SourceB = Decoder0_Source_B is valid & Decoder0_Source_A is valid;
(b) Sel_Decoder0_SourceC = Decoder0_Source_C is valid & EXACTLY_ONE_IS_VALID(Decoder0_Source_A, Decoder0_Source_B);
(c) Sel_Decoder0_SourceD = Decoder0_Source_D is valid & EXACTLY_ONE_IS_VALID (Decoder0_Source_A, Decoder0_Source_B, Decoder0_Source_C);
(d) Sel_Decoder1_SourceA = Decoder1_Source_A is valid & EXACTLY_ONE_IS_VALID(Decoder0_Source_A, Decoder0_Source_B, Decoder0_Source_C, Decoder0_Source_D); and
(e) Sel_Decoder1_SourceB = Decoder1_Source_B is valid & (((Decoder0_Source_A is NOT valid & EXACTLY_ONE_IS_VALID (Decoder0_Source_B, Decoder0_Source_C, Decoder0_Source_D, Decoder1_Source_A))|(Decoder0_Source_A is valid & NONE_OF_IS_VALID (Decoder0_Source_B, Decoder0_Source_C, Decoder0_Source_D, Decoder1_Source_A)));

By determining in advance which of the source registers and destination registers in the micro-ops are to be packed into the packed source structure 210 and the packed destination structure 210, an amount of the attribute bits shown in FIG. 2 may be reduced to speed up unpacking operations downstream in a pipeline of the micro-ops.

Figure 4:
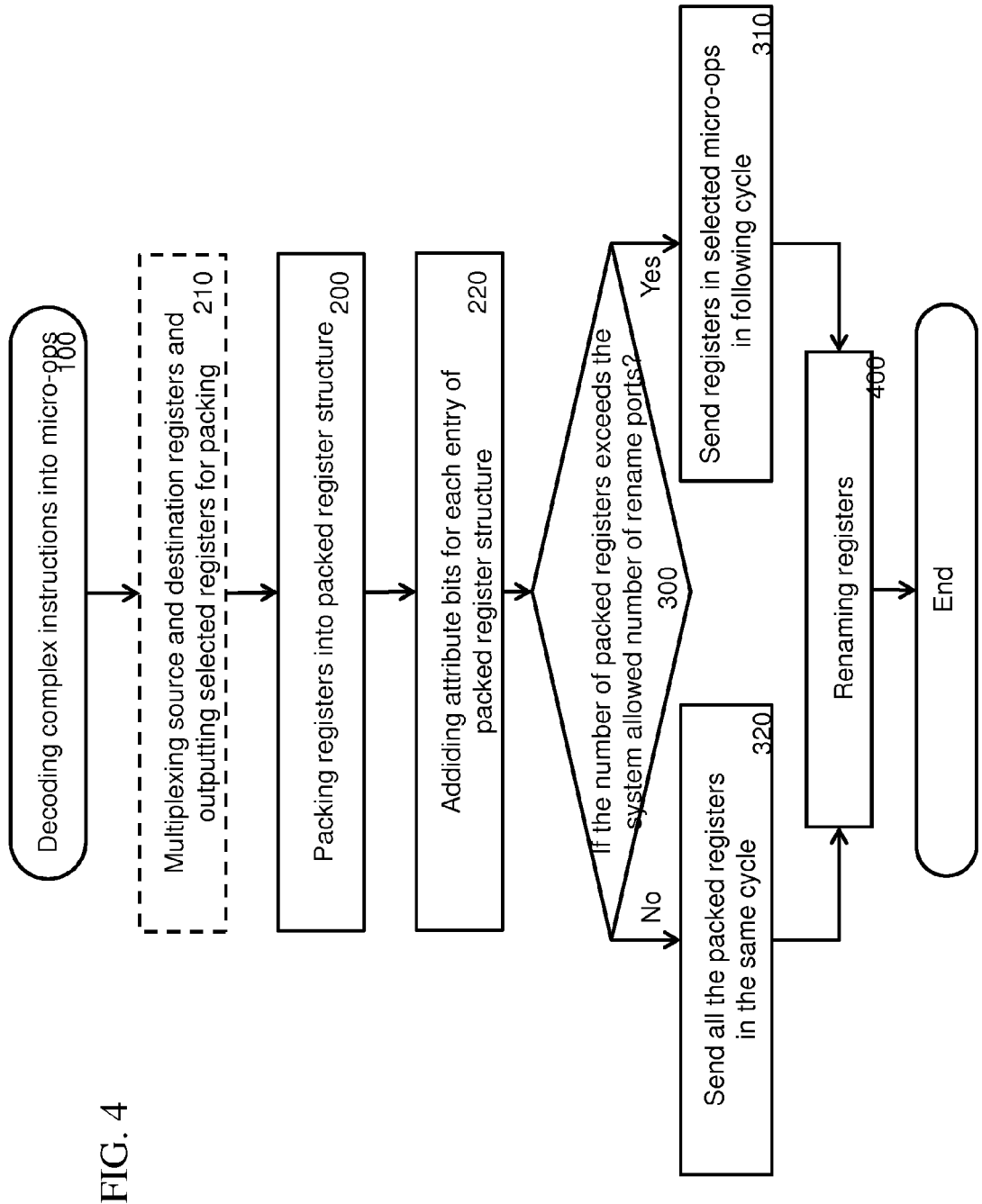
FIG. 4 is a flowchart illustrating register packing according to an exemplary embodiment.

FIG. 4 is a flowchart illustrating register packing before register renaming in a microprocessor, according to an exemplary embodiment.

As shown in the FIG. 4, in operation 100, a complex instruction is decoded into micro-ops at one or more decoders of the microprocessor. In operation 200, source registers and destination registers in the decoded micro-ops are packed into a packed source structure and a packed destination structure to constitute a packed register structure by a packer, respectively. Here, each of the source registers and the destination registers may be a register which has valid source or destination information.

Operation 200 may include additional operation 210 in which predetermined source registers of the micro-ops among entire source registers which can be generated by the decoders within one cycle period are multiplexed to output one register for packing with registers selected by the other MUXs.

Operation 200 may also include additional operation 220 in which a plurality of bits are added to the packed source structure and the packed destination structure to indicate attributes of the packed source registers and attributes of the packed destination registers received as respective entries of the packed source structure and the packed destination structure. These attribute bits indicate attributes of the packed source registers and the packed destination registers received as respective entries of the packed source structure 210 and the packed destination structure 220 as shown in FIG. 2. The attribute bits may include valids bits, decoder ID bits, source ID bits, age mask vector bits, etc., not being limited thereto. Attributes of each entry of the packed source structure and the packed destination structure is represented by one valids bit, one decoder ID bit, one source ID bit and/or a plurality of bits for an age mask vector. The attribute bits described above are not limited to only the valids bits, the decoder ID bits, the source register ID bits and the age mask vector bits. Additional bits may be added to the packed register structure to indicate different attributes of the packed registers. IDs of physical registers stored in the source registers and the destination registers may be such attributes In operation 300, it is determined whether the number of the packed source registers and the packed destination registers exceed a preset number of rename ports provided in a renamer. If it is determined that the number is equal to or less than the preset numbers, respectively, the packed source registers and the packed destination registers are sent to the renamer in the same cycle for renaming.

On the other hand, if it is determined that the number is greater than the preset number, one or more packed source registers and packed destination registers in one or more selected micro-ops among the micro-ops received from the decoders are sent to a renamer in a following cycle for renaming packed registers in the one or more micro-ops. The preset number of ports may be a system-allowable maximum number of rename ports.

The packed registers sent to the renamer are renamed therein, and then sent for scheduling and execution in operation 400.

According to the above described embodiments, a microprocessor having a packer packing source registers and destination registers into a packed register structure before renaming may process more micro-ops without increasing the number of rename ports and adversely impacting a processing time. In the meantime, by restricting the number of source registers and destination registers or by designating predetermined source registers and destination registers to be packed into the packed register structure, additional efficiencies of processing micro-ops may be achieved.

The above described embodiments are meant to be illustrative only and are not intended to be limiting the scope of the inventive concept. For example, the exemplary number of source registers and destination registers in the unpacked structure as well as in the packed structure can be any number. Also, the number of decoders and MUXs can be any number. In addition, as one ordinary skilled can easily recognizes, the words "source" and "destination" in the present drawings include the meaning of "source registers" and "destination registers", respectively. Furthermore, processors according to various embodiments can be any type of processors, microprocessors or central processing units (CPU) or graphical processing units (GPU) or data processing units including multiple-core processors. These and other variations, modifications, additions and improvements may fall within the scope of inventive concept.

In the above described embodiments, the term used to describe each of the components of the microprocessors 20 and 30 such as "decoder", "packer", "renamer", MUX" and "controller" indicates, but is not limited to, a software or hardware component, such as an integrated chip, which performs certain tasks. The functionality provided for in these components may be combined into fewer components or one component or separated into additional components. In addition, these components may be implemented such that they execute one or more computers in a communication system.

It will be understood by those of ordinary skill in the art that various changes in form and details may be made therein without departing from the spirit and scope of the inventive concept. Therefore, the scope of the inventive concept is defined not by the detailed descriptions of the exemplary embodiments but by the appended claims, and all differences within the scope will be construed as being included in the inventive concept.

What is claimed is:

1. An instruction processing method comprising:
receiving a plurality of micro operations (micro-ops) decoded from one or more instructions;
packing a plurality of registers which are included in the micro-ops into a packed register structure comprising a plurality of packed registers based on a preset number of rename ports of a renamer through which the packed registers are read or written for register renaming; and
sending the packed registers to the renamer for register renaming.

2. The method of claim 1, wherein each of the registers packed into the packed register structure comprises valid source data or valid destination data.

3. The method of claim 1, further comprising renaming the packed registers,
wherein the preset number of the rename ports is set to be less than a number of entire registers which the micro-ops are allowed to have as operands in one cycle.

4. The method of claim 3, wherein each of the registers to be packed into the packed register structure is selected from among predetermined registers selected from among the entire registers.

5. The method of claim 4, wherein the each of the registers to be packed is selected based on valids information and age information about the predetermined registers.

6. The method of claim 1, wherein the packed register structure further comprises attribute information about each of the registers packed into the packed register structure.

7. The method of claim 6, wherein the attribute information comprises at least one of:
information about whether each of the registers has valid source or destination information;
identifier of each of the registers; and
identifier of a micro-op among the micro-ops which includes each of the registers.

8. The method of claim 7, wherein the identifier of the micro-op comprises information about a decoder which has decoded the micro-op.

9. The method of claim 7, wherein the attribute information further comprises age information about each of the registers.

10. The method of claim 1, further comprising determining whether a number of the packed registers exceeds the preset number of the rename ports,
wherein if it is determined that the number of the packed registers does not exceed the preset number, the packed registers are sent for register renaming in a current cycle, and wherein if it is determined that the number of the packed registers exceeds the preset number, one or more registers included in one or more micro-ops among the plurality of micro-ops are sent for register renaming in a following cycle.

11. The method of claim 10, wherein the preset number is less than a number of entire registers which the micro-ops are allowed to have as operands.

12. The method of claim 11, wherein the one or more micro-ops are selected from among the plurality of micro-ops based on ages of the plurality of micro-ops.

13. The method of claim 1, wherein the plurality of registers comprises at least one source register and at least one destination register, and
wherein the packed register structure comprises:
a packed source structure comprising at least one packed source register generated by packing the at least one source register; and
a packed destination structure comprising at least one packed destination register generated by packing at least one destination register.

14. The method of claim 13, wherein the packed source structure further comprises source attribute information about a source register from which each of the at least one packed source register is originated; and
wherein the packed destination structure further comprises destination attribute information about a destination register from which each of the at least one packed destination register is originated.

15. The method of claim 14, wherein the source attribute information comprises at least one of:
information about whether the source register has valid source information;
identifier of the source register; and
identifier of a micro-op among the micro-ops which includes the source register, and
wherein the destination attribute information comprises:
information about whether the destination register has valid destination information;
identifier of the destination register; and
identifier of a micro-op among the micro-ops which includes the destination register.

16. The method of claim 15, wherein at least one of the source attribute information and the destination attribute information comprises age information about the source register and the destination register.

17. An instruction processing apparatus comprising at least one microprocessor configured to implement a packer which performs:
receiving a plurality of micro operations (micro-ops) decoded from one or more instructions;
packing a plurality of registers which are included in the micro-ops into a packed register structure comprising a plurality of packed registers based on a preset number of rename ports of a renamer through which the packed registers are read or written for register renaming; and
sending the packed registers for register renaming.

18. The apparatus of claim 17, wherein each of the registers packed into the packed register structure comprises valid source data or valid destination data.

19. The apparatus of claim 17, wherein the preset number of the rename ports is set to be less than a number of entire source registers which the micro-op s are allowed to have as operands in one cycle.

20. The apparatus of claim 19, wherein the microprocessor is further configured to implement a plurality of multiplexers each of which selects each of the registers to be packed into the packed register structure from among predetermined registers selected from among the entire registers.

21. The apparatus of claim 20, wherein the each of the registers to be packed is selected based on valids information and age information about the predetermined registers.

22. The apparatus of claim 17, wherein the packed register structure further comprises attribute information about each of the registers packed into the packed register structure.

23. The apparatus of claim 22, wherein the attribute information comprises at least one of:
information about whether each of the registers has valid source or destination information;
identifier of each of the registers; and
identifier of a micro-op among the micro-ops which includes each of the registers.

24. The apparatus of claim 23, wherein the identifier of the micro-op comprises information about a decoder which has decoded the micro-op.

25. The apparatus of claim 24, wherein the attribute information further comprises age information about each of the registers.

26. The apparatus of claim 17, wherein the microprocessor is further configured to implement a controller which determines whether a number of the packed registers exceeds the preset number of the rename ports,
wherein if it is determined that the number of the packed registers does not exceed the preset number, the controller controls the packer to send the packed registers for register renaming in a current cycle, and
wherein if it is determined that the number of the packed registers exceeds the preset number, the controller controls the packer to send one or more registers included in one or more micro-ops among the plurality of micro-ops for register renaming in a following cycle.

27. The apparatus of claim 26, wherein the preset number is less than a number of entire registers which the micro-ops are allowed to have as operands.

28. The apparatus of claim 27, wherein the controller controls the packer to select the one or more micro-ops from among the plurality of micro-ops based on ages of the plurality of micro-ops.

29. The apparatus of claim 17, wherein the plurality of registers comprises at least one source register and at least one destination register, and
wherein the packed register structure comprises:
a packed source structure comprising at least one packed source register generated by packing the at least one source register; and
a packed destination structure comprising at least one packed destination register generated by packing at least one destination register.

30. The apparatus of claim 29, wherein the packed source structure further comprises source attribute information about a source register from which each of the at least one packed source register is originated; and
wherein the packed destination structure further comprises destination attribute information about a destination register from which each of the at least one packed destination register is originated.

31. The apparatus of claim 30, wherein the source attribute information comprises at least one of:
information about whether the source register has valid source information;
identifier of the source register; and
identifier of a micro-op among the micro-ops which includes the source register, and wherein the destination attribute information comprises:
   information about whether the destination register has valid destination information;
   identifier of the destination register; and
   identifier of a micro-op among the micro-ops which includes the destination register.

32. The apparatus of claim 31, wherein at least one of the source attribute information and the destination attribute information comprises age information about the source register and the destination register.

* * * * *